United States Patent [19]

Ikemura

[11] Patent Number: 5,400,369
[45] Date of Patent: Mar. 21, 1995

[54] FRAM ALIGNER WITH REDUCED CIRCUIT SCALE

[75] Inventor: Kuniichi Ikemura, Tokyo, Japan

[73] Assignee: Oki Electric Industry Co., Ltd., Tokyo, Japan

[21] Appl. No.: 87,281

[22] Filed: Jul. 8, 1993

[30] Foreign Application Priority Data

Jul. 15, 1992 [JP] Japan .................................. 4-188213

[51] Int. Cl.$^6$ ................................................ H04L 7/00
[52] U.S. Cl. ........................................ 375/116; 370/106
[58] Field of Search ...................... 375/114, 116, 113; 370/105.4, 110

[56] References Cited

U.S. PATENT DOCUMENTS

| | | | |
|---|---|---|---|
| 4,835,768 | 5/1989 | Habbard et al. | 375/116 |
| 5,081,654 | 1/1992 | Stephenson et al. | 375/106 |
| 5,113,417 | 5/1992 | McNesby | 375/116 |
| 5,132,991 | 7/1992 | McNesby et al. | 375/116 |
| 5,140,618 | 8/1992 | Kinoshita et al. | 375/116 |
| 5,313,500 | 5/1994 | Rikiyama | 375/116 |

FOREIGN PATENT DOCUMENTS

| | | |
|---|---|---|
| 0397142 | 11/1990 | European Pat. Off. . |
| 0443376 | 8/1991 | European Pat. Off. . |
| 0487943 | 6/1992 | European Pat. Off. . |

OTHER PUBLICATIONS

"2.488 Gb/s SONET Multiplexer/Demultiplexer with Frame Detection Capability", by Dennis T. Kong, IEEE Journal On Selected Areas In Communications, vol. 9, No. 5, Jun. 1991, pp. 726–731.

Primary Examiner—Stephen Chin
Assistant Examiner—Tesfaldet Bocure
Attorney, Agent, or Firm—Steven M. Rabin

[57] ABSTRACT

A frame aligner detects sync patterns consisting of at least two units of data having a first value followed by at least two units of data having a second value in a serial data signal. The serial signal is demultiplexed to units of parallel data, which are stored in a shift register having a capacity of two units of data. All but one bit off the stored data are scanned to detect a unit having the first value. When such a unit is detected, alignment data indicating its position in the shift register are generated. The alignment data are latched and used to extract subsequent units from the shift register. New and old alignment data are compared to detect aligned units having the first value. A sync pattern is recognized as a consecutive sequence of such aligned units followed by a consecutive sequence of units having the second value.

16 Claims, 2 Drawing Sheets

FRAM ALIGNER WITH REDUCED CIRCUIT SCALE

BACKGROUND OF THE INVENTION

This invention relates to tile byte and frame alignment of a high-speed serial data signal such as a synchronous optical network (SONET) signal.

A SONET signal is divided into frames, each of which begins with a synchronization pattern (hereinafter referred to as a sync pattern). A frame aligner in the receiving apparatus searches the incoming tiara For the sync pattern, and after finding the sync pattern, checks that the sync pattern recurs at intervals equal to the frame length. By detecting the position of the sync pattern, the frame aligner can correctly separate the serial data into bytes (byte alignment) and group these bytes into frames (frame alignment).

The ideal way to detect a sync pattern is to shift the incoming signal bit by bit through a shift register having the length of the sync pattern, testing the register contents against the sync pattern at every shift. Unfortunately, this becomes difficult at the speeds typical of synchronous optical transmission systems, which may exceed a gigabit per second. Accordingly, the serial data signal is commonly demultiplexed prior to sync pattern detection. A one-to-eight demultiplexer, For example, converts the serial signal to byte-wide data and enables the frame aligner to operate at one-eighth-the line speed.

A conventional Frame aligner of this type has a byte shifter that receives and shifts incoming data a byte at a time. Since the incoming data are not necessarily aligned on correct byte boundaries, the capacity of the byte shifter is one byte more than the length of the sync pattern. The sync pattern is tested against the contents of the byte shifter at eight possible byte alignments. When a sync pattern is detected, it is used to select one of these alignments, thereby producing correctly byte-aligned output data. Correct alignment of subsequent frames is checked by testing for the presence of the sync pattern at the beginning of each frame.

A problem with this conventional method of byte and frame alignment is the large size of the byte shifter, which takes up excessive space and dissipates excessive power. A four-byte sync pattern, for example, requires a Five-stage byte shifter typically comprising forty flip-flop circuits. An associated problem is the large circuit needed to compare the byte shifter contents with the entire sync pattern at eight possible byte alignments. The size of this circuit becomes an impediment to high-speed operation.

SUMMARY OF THE INVENTION

It is accordingly an object of the present invention to reduce the size of byte and frame alignment circuitry.

Another object of the invention is to increase the operating speed of byte and Frame alignment circuitry.

The invented method searches, in serial data that have been demultiplexed to units of parallel input data, for a sync pattern comprising at least two units having a first value followed by at least two units having a second value. Here the word "unit" denotes a fixed number of bits, such as eight bits in the case of the commonly-employed byte unit.

Successive units of parallel input data are stored in a shift register having a length equal to two units, one unit being shifted in as another is shifted out. All but one of the bits in the shift register are scanned to find a unit of data, aligned at an arbitrary position, having the first value. When such a unit is found, alignment data indicating its position in the shift register are generated, and the alignment data are latched under control of an enable signal.

A comparison of the alignment data with previous latched alignment data serves to detect consecutive, identically-aligned units having the first value. When a certain number of such units have been detected, their alignment data is used to extract subsequent units of data from the same position in the shift register. If a certain number of subsequent units thus extracted have the second value, a sync pattern detect signal is generated.

DETAILED DESCRIPTION OF THE INVENTION

The invention will now be described with reference to the attached drawings. The term "byte" will be used in place of "unit," although it will be clear that the invention can be applied to units other than bytes. The drawings illustrate the invention but do not restrict its scope, which should be determined solely from the appended claims.

Figure 1:
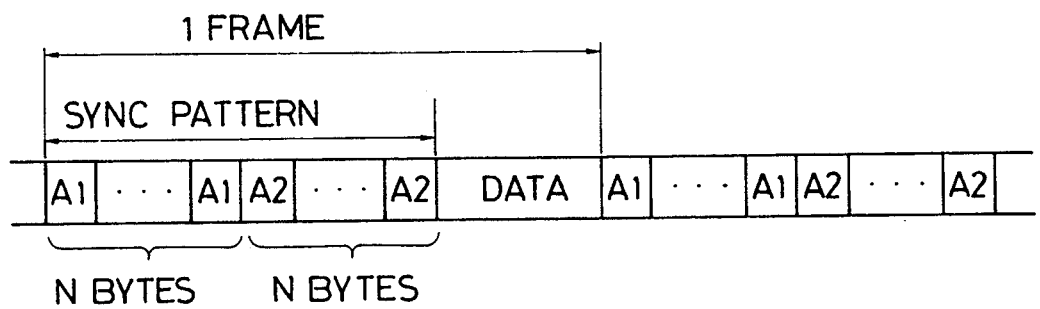
FIG. 1 illustrates the format of a frame.

FIG. 1 shows the Synchronous Transport Module Level N (STM-N) frame format recommended by the Consultative Committee on International Telephony and Telegraphy (CCITT recommendation G708). A frame comprises a sync pattern followed by body data. The sync pattern comprises N bytes each having a certain value A1, followed by N bytes each having another value A2. N can be selected according to the desired synchronization performance, as measured by such parameters as expected average misframe time and reframe time. (Misframe time is time until loss of frame alignment; reframe time is the time from loss of frame alignment until alignment is regained.)

The following explanation will assume that N is two, so that a sync pattern comprises thirty-two bits, consisting of two A1 bytes followed by two A2 bytes. The values of A1 and A2 are not arbitrary, but, are selected so as to avoid ambiguity as explained below. For example, A1 can be 11110110 and A2 can be 00101000.

Figure 2:
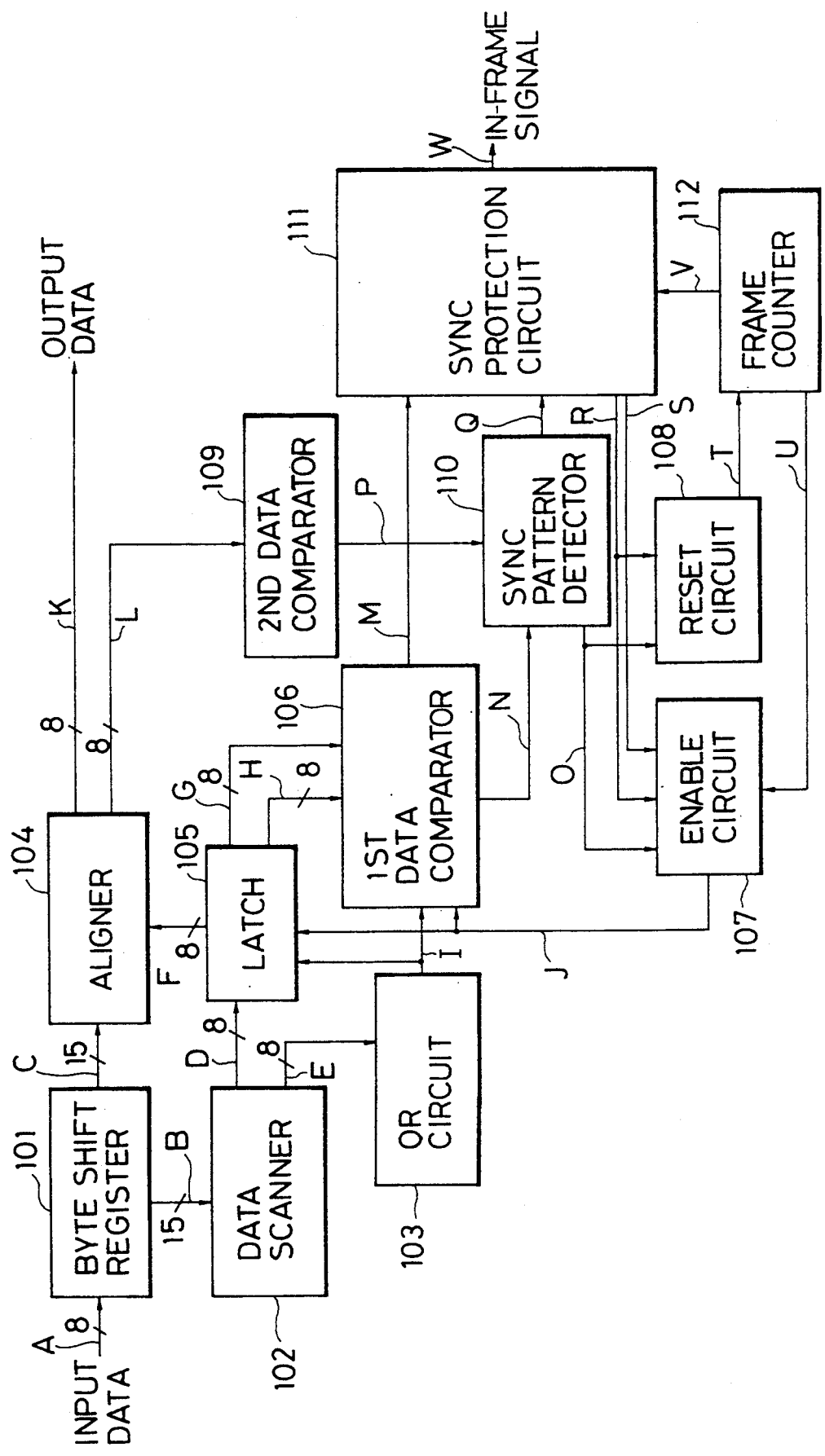
FIG. 2 is a block diagram of the invented frame aligner.

Referring to FIG. 2, the invented Frame aligner comprises a byte shift register 101, a data scanner 102, an OR circuit 103, an aligner 104, a latch 105, a first data comparator 106, an enable circuit 107, a reset circuit 108, a second data comparator 109, a sync pattern detector 110, a sync protection circuit 111, and a frame counter 112. The signals denoted A to H, and signals K and L, are parallel digital signals comprising the indicated number of bits. The other signals are one-bit digital signals having two states, referred to below as true (or one) and false (or zero).

The byte shift register 101 is a sixteen-bit shift register that receives byte-wide input data A. As each new byte of input data A is received, the contents off the byte shift register 101 are shifted eight bits to the right, thereby vacating the leftmost eight bits, and the new byte of input data A is loaded into the vacated eight bits. The first fifteen bits of the byte shift register 101 are provided in parallel form as test data B to the data scanner 102 and as intermediate data C to the aligner 104. The test data B and intermediate data C are identical.

The data scanner 102 searches for the value A1 in the fifteen-bit test data B received from the byte shift register 101, by comparing A1 with bits one through eight, with bits two through nine, and so on, the last comparison being with bits eight through fifteen. The 102 is adapted to perform these eight comparisons simultaneously and output the result as alignment data D and E (D and E are identical). If A1 does not match-the contents of the test data B at any position, all bits of D and E are zero. If a match is detected, a single bit is set to one in D and E, indicating the starting bit position in the test data B at which the match was detected. This position will be referred to below as the phase alignment of the A1 byte.

For example, if A1 matches bits two through nine of the test data B, then the alignment data D and E are both equal to 01000000. Ambiguity is avoided by use of an A1 value (such as 11110110) that cannot occur twice in any run of fifteen consecutive bits.

The OR circuit 103 takes the logical OR of the eight bits of alignment data E, thereby generating a one-bit first sync byte detect signal I that has the value zero when no match is detected and the value one when a match is detected. The first sync byte detect signal I is provided to the latch 105 and first data comparator 106.

The aligner 104 selects eight consecutive bits from the fifteen-bit intermediate data C received from the byte shift register 101, starting at a bit position indicated by latched alignment data F received from the latch 105. The selected eight bits are output as one byte of output data K. The same eight bits are also supplied to the second data comparator 109 as a test byte L.

The latch 105 is controlled by two signals: the first sync byte detect signal I received From the OR circuit 103, and an enable signal J received from the enable circuit 107. If these two signals I and J are both true, the latch 105 latches the alignment data D received from the data scanner 102. The latching is synchronized with the arrival of new input data A in the byte shift register 101, so as to occur, For example, just before the data scanner 102 updates the value of the alignment data D. The latch 105 provides the latched data as the latched alignment data F to the aligner 104, and as latched alignment data H to the first data comparator 106 (F and H are, identical). In addition, the latch 105 passes the alignment data D through to the first data comparator 106 as alignment data G (D and G are identical).

The first data comparator 106 compares the alignment data G and latched alignment data H and sends the result of the comparison to the sync pattern detector 110 and the sync protection circuit 111 as an alignment match signal N and an alignment unmatch signal M. These two signals indicate the comparison result in opposite ways: the alignment match signal N is true when the alignment data G and latched alignment data H are the same; the alignment unmatch signal M is true when the alignment data G and latched alignment data H are different. Output of the alignment match and unmatch signals N and M is also conditional on the first sync byte detect signal I and enable signal J. The alignment unmatch signal M cannot become true unless the first sync byte detect signal I and enable signal J are both true. The alignment match signal N cannot become true unless the current and previous first sync byte detect signal I values are both true.

The enable circuit 107 receives a sync, detect signal O, two hunting signals R and S, and an anticipated sync position signal U, and generates the enable signal J that enables the contents of the latch 105 to be updated and the alignment unmatch signal M to be output. The enable signal, J is asserted (made true) when the logic expression

R OR (S AND U)

changes from false to true. The enable signal J is negated (made false) when the logic expression

O OR NOT[R OR (S AND U)]

is true. At other times, the enable signal J remains in its existing state. The symbols O, R, S and U in these logic expressions denote signals indicated in FIG. 2.

The reset circuit 108 resets the Frame counter 112 by means of a reset signal T, which it generates by taking the logical AND of the sync detect signal O and the hunting signal R.

The second data comparator 109 compares the test byte L received from the aligner 104 with the sync value A2 and provides the result of the comparison to the sync pattern detector 110 as a second sync byte detect signal P, which is true when the test byte L matches A2 and false when it does not.

The sync pattern detector 110 receives the alignment match signal N and second sync byte detect signal P, tests for the occurrence of the sync pattern, and sends the result as the sync detect signal O to the enable circuit 107 and reset circuit 108, and as an identical sync detect signal Q to the sync protection circuit 111. Specifically, the sync pattern detector 110 asserts the sync detect signals O and Q upon receiving an alignment match signal N followed consecutively by two second sync byte detect signals P, and negates the sync detect signals O and Q at other times.

The sync protection circuit 111 receives the above-mentioned alignment unmatch signal M and sync detect signal Q and an anticipated sync detect signal V, and generates an in-frame signal W and the hunting signals R and S. The first hunting signal R indicates that frame alignment has been lost and the frame aligner is hunting for a first sync pattern. The second hunting signal S indicates that a first sync pattern has been detected and the frame aligner is checking for a second sync pattern, or that a sync pattern has been missed and the frame aligner is checking to see if the sync pattern will reappear in the next frame. The in-frame signal W indicates whether the frame aligner is currently in alignment or out of alignment, and is provided to other circuits to indicate whether the output data K are valid or not.

The frame counter 112, after being reset by the reset signal T from the reset circuit 108, begins counting up at the demultiplexed input data rate, with a counting cycle equal to the byte length of one frame. The count in the frame counter 112 is decoded to generate two signals: the anticipated sync position signal U provided to the enable circuit 107, and the anticipated sync detect signal V provided to the sync protection circuit 111. The anticipated sync detect signal V is asserted for one count, at a fixed position in the counting cycle, for example when the frame counter 112 rolls over from its maximum count to a count of zero. The anticipated sync position signal U is asserted during this count and the preceding three counts, so the anticipated sync position signal U remains true for an interval equivalent to the length of the sync pattern. The anticipated sync detect signal V can be provided not only to the sync protection circuit 111 but also to external circuits not shown in the drawing, as a pulse signal indicating the end of one frame and the beginning of the next.

The circuit blocks indicated in FIG. 2 comprise well-known logic circuits such as logic gates and flip-flops. Circuit diagrams will be omitted to avoid obscuring the invention with unnecessary details, which those skilled in the art can readily supply for themselves.

Also omitted, for the same reason, is a description of clocking arrangements. The operation off the frame aligner is synchronized by a clock signal not shown in the drawing. Using a subscript K to denote cycles of this clock, signal timing relationships are typically as follows:

$D_K$ is generated from $B_{K-1}$ $M_K = \text{NOT}(G_{K-1} \text{ AND } H_{K-1}) \text{ AND } I_{K-1} \text{ AND } I_{K-2}$ $N_K = G_{K-1} \text{ AND } H_{K-1} \text{ AND } I_{K-1} \text{ AND } I_{K-2}$ $O_K = P_K \text{ AND } P_{K-1} \text{ AND } N_{K-1}$ $Q_K = O_{K-1}$ $T_K = O_{K-1} \text{ AND } R_{K-1}$ With sufficiently fast circuit elements, D can be used directly as G, in which case $G_K = D_K$, and $I_K$ is the logical OR of all bits of $E_K$. With slower circuit elements, however, $G_K = D_{K-1}$, $I_K$ is the logical OR of all bits of $E_{K-1}$, and extra synchronizing latches must be inserted in the byte shift register 101, OR circuit 103, and first tiara comparator 106.

In actual implementations it may be G, rather than D, that is latched to obtain F and H, so that in the clock cycle after G is latched, $F_K = H_K = G_{K-1}$. Accordingly, there is a lag of two clocks (if $G_K = D_K$) or three clocks ($G_K = D_{K-1}$) from the output of test data D containing the value A1 to the output of corresponding latched alignment data F and H from the latch 105.

Figure 3:
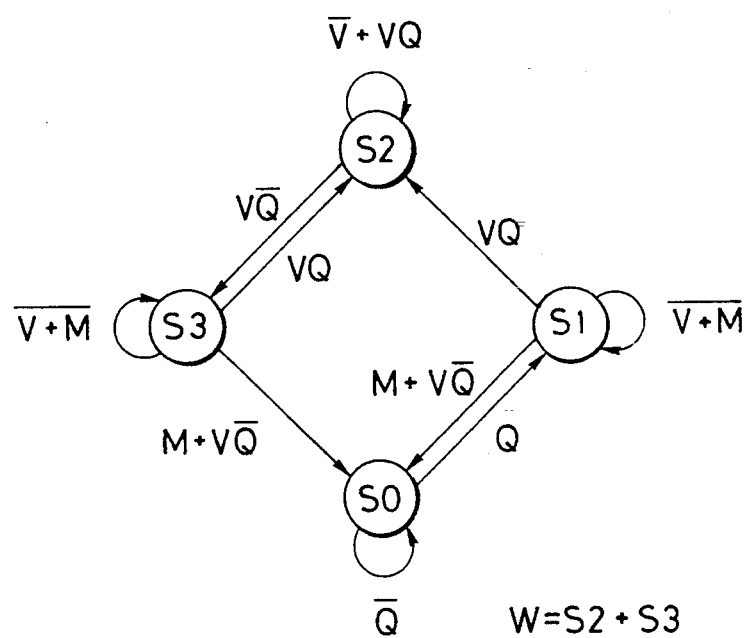
FIG. 3 is a state transition diagram illustrating the operation of the invented frame aligner.

The operation of the invented frame aligner will now be explained with reference to FIG. 3, which shows state transitions of the sync protection circuit 111. The sync protection circuit 111 has four states: a first out-of-frame state S0, a last out-of-frame state S1, a first in-frame state S2, and a last in-frame state S3. Transitions among these states are indicated by standard logic notation, a plus sign indicating OR, juxtaposition indicating AND, and an overbar indicating NOT.

In the first out-of-frame state S0, byte and frame alignment have been lost, and the frame aligner is waiting to detect a first sync pattern. In this state the first hunting signal R is true, the second hunting signal S and in-frame signal W are false, and the enable signal J output by the enable circuit 107 is true. The sync protection circuit 111 remains in this state until the sync detect signal Q is asserted; that is, until a sync pattern is detected.

As each byte of input data A arrives, it is stored in the first eight bits of the byte shift register 101, the previous byte being moved into the second eight bits. A Feature of the present invention is that regardless of the length of the sync pattern, the byte shift register 101 need only be sixteen bits long. The data scanner 102 searches for the value A1 in the first fifteen bits in the byte shift register 101.

When the first A1 byte arrives, it will be fully present just once in the fifteen bits searched by the data scanner 102. When the data scanner 102 finds this first A1 pattern, it indicates the position of the A1 pattern by setting the corresponding bit in the alignment data D and E. The OR circuit 103 responds by asserting the first sync byte detect signal I, causing the latch 105 to latch the alignment data D just as the first A1 byte is being shifted out of the byte shift register 101.

In a valid sync pattern the first A1 byte is followed immediately by a second A1 byte, which is detected in the same way by the data scanner 102 and OR circuit 103. Being consecutive, the first and second A1 bytes have the same phase alignment, so the alignment data D of the second A1 byte, which is now passed from the data scanner 102 through the latch 105 to the first data comparator 106 as the alignment data G, matches the alignment data D of the first A1 byte, which is now latched in the latch 105 and provided to the first data comparator 106 as the latched alignment data H. Since the alignment data G and latched alignment data H match, the first data comparator 106 asserts the alignment match signal N and negates the alignment unmatch signal M.

As the second A1 byte is shifted out of the byte shift register 101, the latch 105 latches its alignment data D, which has the same value as the alignment data D of the first A1 byte. The latched value is provided to the aligner 104 as the latched alignment data F, as well as to the first data comparator 106 as the latched alignment data H.

The second A1 byte is followed immediately by the first A2 byte which, being consecutive, is aligned in phase. On the basis of the latched alignment data F provided from the latch 105, the aligner 104 extracts this A2 byte from the intermediate data C and provides it as the test byte L to the second data comparator 109. The second data comparator 109 tests this byte, finds that it matches the A2 pattern, and asserts the second sync byte detect signal P.

The A1 and A2 values are such that when the data scanner 102 receives fifteen bits containing this first A2 byte, it no longer detects the A1 pattern. The data scanner 102 therefore clears all bits in the alignment data D and E to zero and the OR circuit 103 negates the first sync byte detect signal I. Accordingly, when the first A2 byte is shifted out of the byte shift register 101 the latch 105 does not latch the zero value of its alignment data D, but continues to provide the, aligner 104 with latched alignment data F indicating the phase alignment of the first and second A1 bytes.

The second A2 byte is accordingly processed in the same way as the first, causing the second data comparator 109 to assert the second sync byte detect signal P again. The sync pattern detector 110 has now received an alignment match signals N and two second sync byte detect signal P in consecutive sequence, so it asserts the sync detect signals O and Q. Assertion of the sync detect signal O causes the enable circuit 107 to negate the enable signal J. Assertion of the sync detect signal Q causes the sync protection circuit 111 to change from the first out-of-frame state SO to the last out-of-frame state S1, negate the first hunting signal R, and assert the second hunting signal S. Before the first hunting signal R is negated, however, there is an interval during which the sync detect signal O and first hunting signal R are both asserted; this causes the reset circuit 108 to generate a reset signal T that resets the frame counter 112, thereby negating the anticipated sync position signal U and anticipated sync detect signal V.

in the last out-of-frame state S1, the frame aligner has detected a first sync pattern and is waiting to confirm alignment by detecting the next sync pattern. In this state, the anticipated sync position signal U and anticipated sync detect signal V are initially false. The anticipated sync position signal U remains false until the anticipated start of the next sync pattern. The anticipated sync detect signal V remains false until the anticipated end of this sync pattern. More specifically, the anticipated sync detect signal V remains false until the frame counter 112 reaches a count corresponding to the frame length minus the length of the sync pattern, and the anticipated sync detect signal V remains false until the frame counter 112 reaches a count corresponding to the frame length.

While the anticipated sync position signal U is false the enable signal J also remains false, because the first hunting signal R and anticipated sync position signal U are both false, making O OR NOT[R OR (S AND U)] true. The latch 105 therefore continues to output latched alignment data F indicating the phase alignment of the A1 bytes in the first sync pattern, and the aligner 104 generates output data K with this phase alignment.

When the anticipated start off the next sync pattern is reached, the frame counter 112 asserts the anticipated sync position signal U. Since the second hunting signal S is also asserted, the logic expression R OR (S AND U) changes from false to true and the enable circuit 107 asserts the enable signal J. If an A1 byte is present at this point in the input data A1 it is detected by the OR circuit 103 and the first sync byte detect signal I is asserted. The alignment data D and G now indicate the phase alignment of this new A1 byte, while the latched alignment data H still indicates the phase alignment of the old A1 bytes in the preceding frame.

If the phase alignment of these new and old A1 bytes is different, the first data comparator 106 asserts the alignment unmatch signal M. Assertion of the alignment unmatch signal M causes the sync protection circuit 111 to revert to the first out-of-frame state S0, negating the second hunting signal S and asserting the first hunting signal R. Operation then continues as described above, as if the frame aligner had just detected a first A1 byte in the first out-of-frame state S0.

If the phase alignment of the new and old A1 bytes is the same, the sync protection circuit 111 remains in the last out-of-frame state S1 and the latch 105, first data comparator 106, second data comparator 109, and sync pattern detector 110 proceed to check for the rest of the sync pattern. The anticipated sync position signal U remains true for the anticipated length of the sync pattern, enabling the sync pattern to be detected in the same way as the sync pattern in the preceding frame. When the anticipated end of this sync pattern is reached, the frame counter 112 asserts the anticipated sync detect signal V. At this time, if the sync detect signal Q is false, indicating that a sync pattern was not detected, the sync protection circuit 111 changes to the first out-of-frame state S0 and starts searching again for a new first sync pattern. If the sync detect signal Q is true, however, the sync protection circuit 111 changes to the first in-frame state S2, negates the second hunting signal S, and asserts the in-frame signal W.

In the first in-frame state S2 the frame aligner has detected sync patterns in two consecutive frames, so the output data K are assumed to be in correct byte and frame alignment. The first hunting signal R and second hunting signal S are both false, so the logic expression R OR (S AND U) is false and the logic expression O OR NOT[R OR (S AND U)] is true. The enable signal J is thus negated and kept in the false state, the latch 105 continues to hold data indicating the phase alignment of the sync pattern in the preceding frames, the aligner 104 continues to select output data K with this phase alignment, and the first data comparator 106 continues to hold the alignment unmatch signal M in the false state.

The data scamper 102, OR circuit 103, and first data comparator 106 continue to operate in the first in-frame state S2, generating a true alignment match signal N whenever two consecutive A1 bytes occur with the same phase alignment as the A1 bytes in the preceding frame. The second data comparator 109 and sync pattern detector 110 also continue to operate, the second data comparator 109 asserting the second sync byte detect signal P whenever it detects an A2 byte, and the sync pattern detector 110 asserting the sync detect signals O and Q in response to an alignment match signal N followed by two consecutive second sync byte detect signals P.

The frame counter 112 also continues to operate, counting in cycles equivalent to the frame length. At the beginning of each anticipated sync pattern, the anticipated sync position signal U is asserted, but it is ignored by the enable circuit 107 because the hunting signals R and S are both false. At the end of each anticipated sync pattern, however, the anticipated sync detect signal V is asserted for one count. If the sync detect signal Q is true at this time, indicating that a sync pattern has just been detected, the sync protection circuit 111 remains in state S2. If the sync detect signal Q is false at this time, indicating a missed sync pattern, the sync protection circuit 111 asserts the second hunting signal S and changes to the last in-frame state S3.

In the last in-frame state S3 the sync protection circuit 111, having missed one sync pattern, waits to see if a sync pattern will reappear in the next frame. When the frame counter 112 reaches the count indicating the anticipated start of this sync pattern it asserts the anticipated sync position signal U. Since the second hunting signal S is also true, the enable circuit 107 asserts the enable signal J, enabling-the data scanner 102, OR circuit 103, latch 105, first data comparator 106, second data comparator 109, and sync pattern detector 110 to detect this sync pattern in the manner already explained. At the end of the anticipated sync pattern the frame counter 112 asserts the anticipated sync detect signal V.

The transitions from the last in-frame state S3 are similar to the transitions from the last out-of-frame state S1: to the first in-frame state S2 if a sync pattern is detected in the anticipated position, with the anticipated phase alignment; and to the first out-of-frame state S0 if the sync pattern is not detected, or if the phase alignment of either A1 byte is incorrect. A transition to the first in-frame state S2 causes the sync protection circuit 111 to negate the second hunting signal S. A transition to the first out-of-frame state S0 causes the sync protection circuit 111 to negate the second hunting signal S and in-frame signal W and assert, the first hunting signal R.

In general, the sync protection circuit 111 can be provided with X in-Frame states and Y out-of-frame states, so that Y sync patterns must be detected before the in-frame signal W is asserted, and X sync patterns must be missed before the in-frame signal W is negated. In the preceding description X and Y were both equal to two, but X and Y can be any positive integers. The transition logic for transitions from the last pre- and out-or-frame states is similar to that for transitions from the S3 and S1 states in FIG. 3. The transition logic for other states is similar to that for transitions from the S2 and S0 states in FIG. 3.

The invention is not restricted to sync patterns with just two A1 bytes and two A2 bytes. If the sync pattern has a larger number of A2 bytes, the sync pattern detector 110 can be adapted to assert the sync detect signal Q only after receiving that number of consecutive second sync byte detect signals P. If the sync pattern has a larger number of A1 bytes, the number of consecutive first sync byte detect signals I required for output of the alignment match signal N can be increased. These modifications are not absolutely necessary, however. The invention as described above can be applied to frames with longer sync patterns, in which case it will operate by detecting the last two A1 bytes and first two A2 bytes in each sync pattern.

Regardless of tube length of the sync pattern and the number of bytes detected, for the case of byte-wide input data A, the byte shift register 101 in FIG. 2 requires a length of only sixteen bits, and the data scanner 102 has to make comparisons with only fifteen of those bits. In general, if the serial input data are demultiplexed to Z-bit wide units of parallel data, and the sync pattern comprises a certain number of these units having mutually identical values A1 followed by units having mutual identical values A2, the byte shift register 101 need only store 2Z bits, and the data scanner 102 need only test (2Z-1) bits. As a result, the invented frame aligner is smaller, faster, and more power-efficient than prior-art frame aligners that shifted and tested the entire sync pattern all at once.

What is claimed is:

1. A method of searching for and checking sync patterns in frames of serial data that have been demultiplexed to units of a certain number of bits of parallel input data, comprising the steps of:
    (a) shifting successive units of parallel input data into a shift register having a length equal to two of said units;
    (b) testing all bits in said shift register, except for one bit in said shift register, to find a unit of data having a certain first value, and generating alignment data indicating where this unit of data was located in said shift register;
    (c) latching said alignment data responsive to an enable signal, and outputting the latched alignment data;
    (d) comparing the alignment data generated in said step (b) for said unit of data with alignment data latched in said step (c) for a preceding unit of data, both units of data having said first value;
    (e) if a certain number of units of data having said first value are found consecutively and said step (d) indicates identical alignment data, checking values of a certain number of succeeding units of data at a position in said shift register indicated by the alignment data latched in said step (c); and
    (f) if said certain number of succeeding units of data all have a certain second value, generating a sync pattern detect signal to indicate that a sync pattern has been detected.

2. The method of claim 1, wherein said units are bytes consisting of eight bits each.

3. The method of claim 1, wherein the certain number of units of data mentioned in said step (e) is two units of data.

4. The method of claim 1, wherein the certain number of succeeding units of data mentioned in said steps (e) and (f) is two units of data.

5. The method of claim 1, further comprising the steps of:
    (g) asserting an in-frame signal if a certain number of said sync patterns are detected at consecutive frame intervals, as indicated by said sync pattern detect signal in said step (f); and
    (h) negating said in-frame signal if a certain number of said sync patterns are missed at consecutive frame intervals, as indicated by a failure to generate said sync pattern detect signal in said step (f).

6. The method of claim 5, wherein the certain number mentioned in said sleep (g) is two.

7. The method of claim 5, wherein the certain number mentioned in said step (h) is two.

8. The method of claim 5, further comprising the steps of:
    (i) when said in-frame signal is false, asserting said enable signal until said sync pattern is detected, then negating said enable signal and reasserting said enable signal only at further anticipated sync pattern positions; and
    (j) when said in-frame signal is true, negating said enable signal until said sync pattern is missed, then reasserting said enable signal at further anticipated sync pattern positions;
    wherein said latching in said step (c) is performed only if said enable signal is true.

9. The method of claim 9 wherein, if said enable signal is reasserted at an anticipated sync pattern position in said step (j), and if a unit of data having said first value is then found in said step (b) but its alignment data do not match the alignment data latched in said step (c), said in-frame signal is negated and said step (i) begins again.

10. An alignment circuit for aligning frames of serial data that have been demultiplexed to units of a certain number of bits of parallel input data, comprising:
    a shift register for storing two of said units of said parallel input data;
    a data scanner coupled said shift register, for testing all bits in said shift register except for one bit in said shift register, detecting a unit having a certain first value, and when such a unit is detected, generating alignment data indicating a position in said shift register where said unit was detected;
    a logic circuit coupled to said data scanner, for determining, from said alignment data, whether a unit having said first value has been detected, and generating a first sync unit detect signal;

a latch coupled to said logic circuit, for latching said alignment data responsive to said first sync unit detect signal and an enable signal;

a first data comparator coupled to said latch, for comparing alignment data output from said data scanner with alignment data latched in said latch, counting consecutive occurrences of said first sync unit detect signal, and generating an alignment match signal when said first sync unit detect signal has been received a certain number of times consecutively and said alignment data output from said data scanner match said alignment data latched in said latch;

an aligner coupled to said shift register, for extracting a unit of data from said shift register according to the alignment data latched in said latch;

a second data comparator coupled to compare the unit of data extracted by said aligner with a certain second value and generate a second sync unit detect signal when they match; and a sync pattern detector coupled to receive said alignment match signal and said second sync unit detect signal and generate a sync detect signal when said alignment match signal is followed consecutively by a certain number of second sync unit detect signals.

11. The circuit of claim 10, further comprising:

a sync protection circuit coupled to receive said sync detect signal, for generating a first hunting signal when searching for an initial sync pattern, a second hunting signal when said initial sync pattern has been found but a certain number of sync patterns have not yet been found in consecutive frames, and an in-frame signal when said certain number of sync patterns have been found in consecutive frames;

a reset circuit coupled to receive said sync detect signal and said first hunting signal (R), for generating a reset signal;

a frame counter coupled to receive and be reset by said reset signal, for generating an anticipated sync position signal at anticipated sync pattern positions, and an anticipated sync detect signal at an end of each of said anticipated sync pattern positions; and an enable circuit coupled to receive said sync detect signal, said first hunting signal, said second hunting signal, and said anticipated sync position signal, and generate said enable signal.

12. The circuit of claim 11, wherein said sync protection circuit has at least the following states:

a first out-of-frame state in which said first hunting signal is asserted and said second hunting signal and said in-frame signal are negated;

a last out-of-frame state in which said second hunting signal is asserted and said first hunting signal and said in-frame signal are negated;

a first in-frame state in which said in-frame signal is asserted and said first hunting signal and said second hunting signal are negated; and a last in-frame state in which said in-frame signal and said second hunting signal are asserted and said first hunting signal is negated.

13. The circuit of claim 12, wherein said enable circuit asserts said enable signal when said first hunting signal is asserted, and also asserts said enable signal when said second hunting signal and said anticipated sync position signal are simultaneously asserted, but negates said enable signal when said sync detect signal is asserted.

14. The circuit of claim 13, wherein:

a transition from said first out-of-frame state to said last out-of-frame state occurs when said sync detect signal is asserted;

a transition from said last out-of-frame state to said first in-frame state occurs when said anticipated sync detect signal and said sync detect signal are simultaneously assorted;

a transition from said last out-of-frame state to said first out-of-frame state occurs when said anticipated sync detect signal is asserted and said sync detect signal is not simultaneously asserted;

a transition from said first in-frame state to said last in-frame state occurs when said anticipated sync detect signal is asserted and said sync detect signal is not simultaneously asserted;

a transition from said last in-frame state to said first in-frame state occurs when said anticipated sync detect signal and said sync detect signal are simultaneously asserted; and a transition from said last in-frame state to said first out-of-frame state occurs when said anticipated sync detect signal is asserted and said sync detect signal is not simultaneously asserted.

15. The circuit of claim 14, wherein said first data comparator also generates an alignment unmatch signal responsive to said first sync unit detect signal and said enable signal, indicating that said alignment data do not match previous alignment data latched in said latch, and provides said alignment unmatch signal (M) to said sync protection circuit.

16. The circuit of claim 15, wherein:

a transition from said last out-of-frame state to said first out-of-frame state also occurs when said alignment unmatch signal is asserted; and a transition from said last in-frame state to said first out-of-frame state also occurs when said alignment unmatch signal is asserted.

* * * * *